Feb. 9, 1943.  C. E. BRANICK  2,310,891
TIRE SPREADER
Filed Jan. 17, 1938  2 Sheets-Sheet 1

Inventor
Charles E. Branick
By Howard Fischer
Attorney

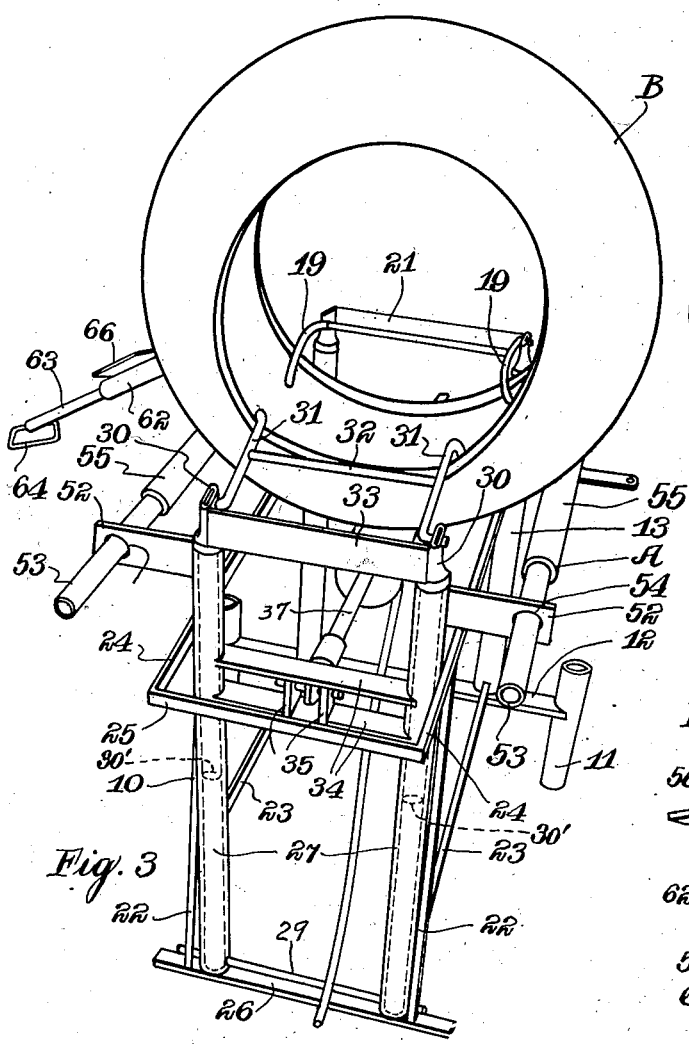

Patented Feb. 9, 1943

2,310,891

UNITED STATES PATENT OFFICE 2,310,891

TIRE SPREADER

Charles E. Branick, Fargo, N. Dak.

Application January 17, 1938, Serial No. 185,366

11 Claims. (Cl. 154—9)

My invention relates to an improvement in tire spreaders where it is designed to provide an apparatus for spreading a tire casing and for supporting the same in spread position so that the inside of the casing may be examined or repaired.

Tire spreading devices have been in use for several years. These spreaders are of various types and operate in various ways. Most of the former types of tire spreaders are very complicated in construction and costly to manufacture. Furthermore, most previous types of tire spreaders have been bulky and have required a considerable amount of floor space for operation.

It is the object of the present invention to provide a tire spreader constructed in a simple manner and which may be sold at a low cost. This spreader requires a small amount of floor space and may be operated automatically by air or fluid pressure.

It is an object of the present invention to provide a simple stand having pairs of hooks which engage opposite sides of the tire casing, which hooks may be spread apart to flex the casing into position where the inner surface of the same may be inspected. While hooks of this type have previously been employed, the manner in which the hooks are mounted is believed novel.

It is a feature of the present invention to provide a construction embodying two sets of hooks engaging opposite sides of a tire casing, one set of which remains stationary and the other set of which is moved away from the stationary hooks to spread the tire. By this construction it is only necessary to move one set of the hooks, simplifying the construction and making the same less expensive.

It is a purpose of the present invention to provide a construction wherein the tire rests upon supports which are telescopically arranged so that the casing may move with respect to the hooks while being spread. In this way there is no tendency for the casing to bind while being spread, even though the same is supported while being spread. This means enables tires of various sizes to be spread by the same hooks without the necessity of using care in properly positioning the casing on the supporting means before the spreading action.

It is a further feature of my invention to provide a means of lifting the tire into place upon the spreader without the necessity of lifting the same vertically into place. By this construction it is possible for one man to lift tires which would be too heavy for him to handle otherwise.

These and other objects and novel features of my invention will be more clearly and fully set forth in the following specification and claims.

In the drawings forming a part of my specification:

Figure 3 is a perspective rear view of my machine.

Figure 4 is a cross-sectional view through the spreading cylinder taken on a transverse plane centrally through the same.

Figure 5 is a cross-sectional view through one of the adjustable posts supporting the spreading hooks.

Figure 6 is a perspective detail view of the swivel connection between the telescoping tire lift.

Figure 7 is a view similar to Figure 6 showing the parts in a different position.

Figures 1, 2:
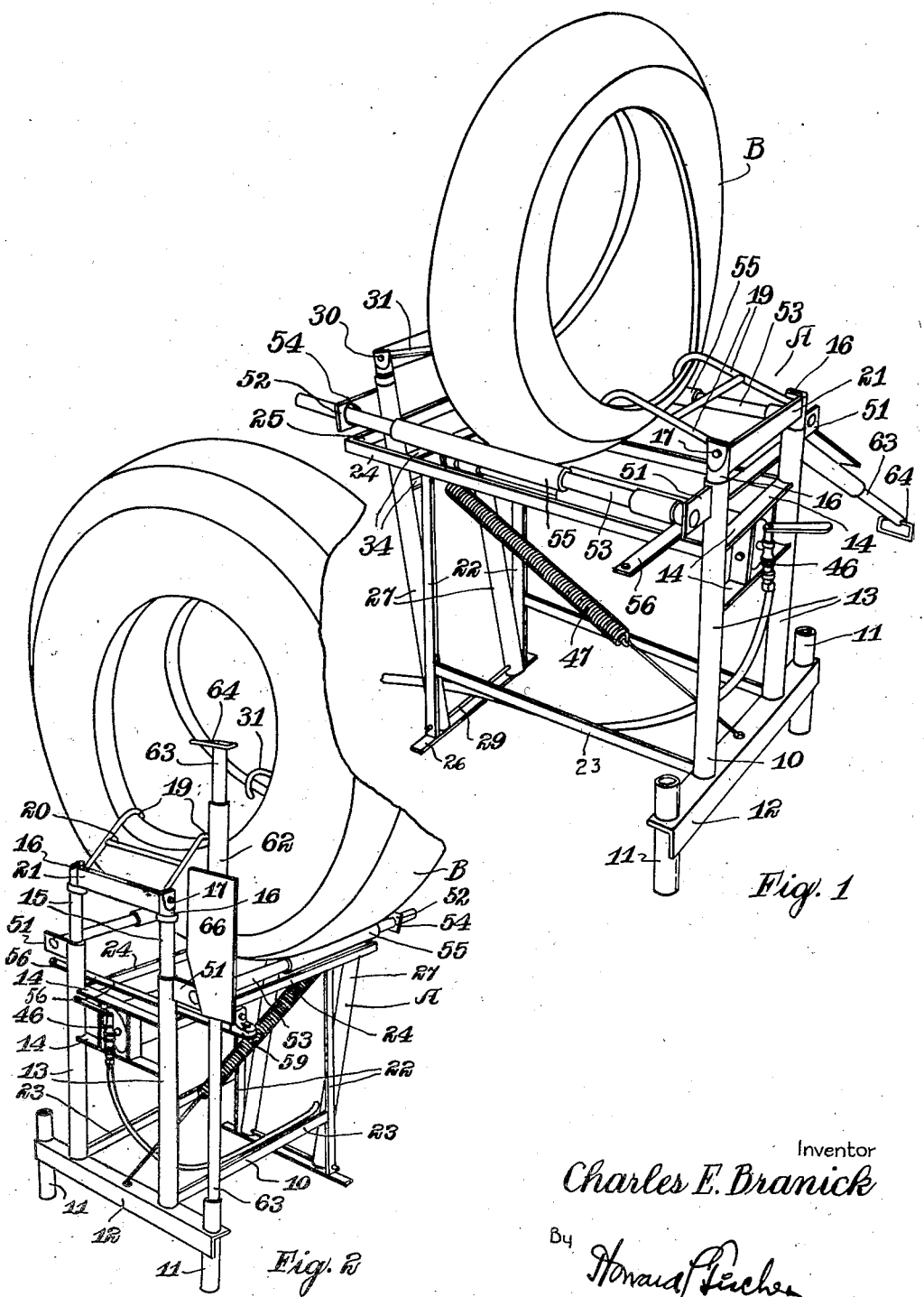
Figure 1 is a perspective view of my machine showing a tire in spread position thereupon.
Figure 2 is a perspective view of my machine taken from a slightly different angle.

My tire spreader A is designed to support the tire B or the like in order to spread the same for inspection or repair as illustrated in Figures 1, 2, and 3 of the drawings. The spreader A includes a frame 10 which comprises in preferred form a pair of short tubular front legs 11 held in spaced relationship extending vertically and parallel by means of the angle iron 12. A pair of tubular posts 13 extend upwardly from the angle iron 12 in spaced parallel relationship and are held in proper relative position by cross bars or arms 14. The upper ends of the posts 13 are open and accommodate the shanks 15 of bearings 16. The bearings 16 are formed of tubular material flattened together and drilled to accommodate the ends 17 of hooks 19, which extend therethrough. The hooks 19 are connected by a cross bar 20, and the ends 17 thereof turn outwardly in alignment to extend through the aligned openings through the end bearings 16.

A bar or strip of metal or the like 21 connects the bearings 16 and holds these bearings from turning within the posts 13 and also causes these members to move in unison. The strips or bars 21 also serve the function of providing a rest against which the hooks 19 engage when the hooks are disengaged from the tire and swing back free of the tire B.

The posts 13 are connected to vertical rear supports 22 by means of longitudinally extending frame members 23 and 24. The longitudinally extending frame members 23 merely connect the posts 13 and the vertical supports 22, but the members 24 extend beyond the vertical supports 23 and are connected together at the end by means of a cross member 25. This cross member 25 acts to limit the spreading action in a manner which will be later seen more clearly. The lower extremities of the vertical supports 22 are connected by a cross strip 26 which lies upon the floor and holds these vertical members in spaced relationship.

A pair of posts or arms 27 are pivotally secured at 29 to the vertical supports 22 near the lower end of the same. These posts are formed similarly to the posts 13 and are provided with bearings 30 identical to the bearings 16 having shanks 30' similar to shanks 15 for pivotally supporting the hooks 31, which are connected to operate in unison by the cross member 32. The shanks 30' of the bearings 30 are vertically adjustable within the posts 27. The bearings 30 are connected by a cross strip 33 so that these bearings will move in unison, will not rotate, and will form a support for the hooks 31 in disengaged position of the same.

The posts 27 are held in spaced relationship by parallel cross bars 34. These cross members 34 are connected by vertical fins 35, as seen in Figure 3 of the drawings, and the end 36 of the piston rod 37 is pivoted on the pin 39 between the fins 35 and is held in position by sleeves 40 encircling the pin 39. The piston rod 37 extends through the end 41 of the cylinder 42 and is connected to a piston 43 therein. The end 44 of the cylinder 42 opposite the end 41 is provided with an inlet 45 equipped with a valve 46 by means of which air or fluid under pressure may be introduced into the cylinder 42 for forcing the piston 43 to the left, as viewed in Figure 4 of the drawings. By proper operation of the valve 46, the air or liquid may be exhausted from the cylinder 42 when it is desired to move the piston 43 to the right. A coil spring 47 is connected between the angle iron 12 and one of the cross members 34, and this spring tends to urge the piston 43 toward the right end of the cylinder 42 as seen in Figure 4.

The cylinder 42 is pivoted at 49 to vertical spacers 50 connecting the cross members 14. Thus the cylinder and piston rod are pivotally connected between the pair of posts 13 and the pivoted pair of posts 27. By operation of the valve 46 to force air into the cylinder 42, the rod 37 is forced from the cylinder, spreading the upper ends of the posts 27 from the upper ends of the posts 13. The hooks 31 are thus moved away from the hooks 19, so that when these hooks are in position to engage the beads or opposite edges of the casing B, these edges will be spread apart by action of the cylinder 42.

Lugs 51 extend outwardly from oppositely disposed sides of the posts 13 near the top of the same, and lugs 52 extend outwardly from the posts 27. Elongated rods or arms 53 are connected to the lugs 51 and extend through openings 54 in the lugs 52. Sleeves 55 are rotatably mounted upon the rods 53 for engagement with the outer surface of the casing B. As the sleeves 55 may rotate or move longitudinally with respect to the rods 53, any separating movement between the posts 27 and 13 is not transmitted to the casing B, which may assume proper position between the hooks 19 and 31.

Near the posts 13 I provide a transversely extending arm 56 welded to the frame members 24 which projects beyond the posts 13 in a lateral direction. To one end or the other of this arm 56, I pivotally secure by means of a bolt 57 or the like, an angle bracket 59. The bracket 59 is pivoted by the bolt 60 or the like to the short arm 61 which in turn is integral with a sleeve 62. The sleeve 62 encircles a rod or tube 63 in a manner to permit longitudinal movement of the member 63 with respect to the sleeve 62. At the extreme end of the rod 63, I provide a substantially rectangular loop handle 64.

When the lift just described is not in use, it is ordinarily pivoted into the position illustrated in Figure 2 of the drawings, wherein the rod or tube 63 extends down into the open upper end of one tubular leg 11. When it is desired to use this lift, however, the rod 63 is slidably moved upwardly within the sleeve 62 and the angle bracket 59 is pivoted with respect to the arm 56 until the arm 63 may be moved down as illustrated in Figures 1 and 3, until the handle 64 engages the surface of the floor. The tire may be rolled upon this telescoping support into position upon the sleeves 55, the plate 66 on the sleeve 62 forming a platform to simplify this action. If desired, this lift may be used as a lever, and pivoted upwardly about the bolt 60 to assist in moving the tire B into proper position.

The operation of my spreader is believed clearly apparent from the foregoing description. The tire B is lifted into place with the assistance of the telescoping lift, and the casing is held in vertical position while the hooks 19 and 31 are pivoted into engagement with the opposed sides of the casing. The valve 46 is then operated to permit compressed air or fluid to flow into the cylinder 42, forcing the piston 43 toward the end 41 thereof, and pivoting the posts 27 about the pivot 29, thus spreading the upper ends of these posts apart and spacing the hooks 31 from the hooks 19. When the spread portion of the tire has been repaired or inspected, the tire may be permitted to assume normal position by operating the valve 46 to release the air or fluid from the cylinder 42, whereupon the spring 47 pulls the posts 27 into the vertical position.

I have stated that the arm 56 projects beyond the posts 13 in a lateral direction. This construction enables me to pivot the angle bracket 59 to either end of this arm 56. It will therefore be obvious that my spreader may be easily adapted to fit in a limited space and may be suited for operation by a left-handed or right-handed person, and the tires may be mounted in place from either side of the device where it is most convenient.

In accordance with the patent statutes I have described the principles of construction and operation of my tire spreader, and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. In a tire spreader, a frame, substantially horizontally extending rods, sleeves thereon longitudinally slidable relative to said rods for slidably supporting a tire casing to slide longitudinally of said rods, a pair of hooks pivoted along fixed axes to one end of said frame engageable with one side of the tire casing, arms pivoted to the other end of said frame, hooks pivoted to said arms engageable with the other side of said tire casing, and means for pivoting said arms for spreading said casing.

2. In a tire spreader, a supporting frame, end posts on one end thereof fixed in substantially vertical position, hook means pivotally secured to said end posts engageable with one side of a tire casing, end posts on the other end of said frame pivoted near their lower end to said frame, hook means pivotally secured to the upper extremity of said last named end posts engageable with the other side of a tire casing, and a cylinder and piston assembly including a cylinder pivoted to said frame and a piston pivotally connected to said pivoted end posts for pivoting said last named end posts to spread said casing.

3. In a tire spreader, a supporting frame, hook means pivoted to one end of said frame engageable with one side of a tire casing, arm means pivoted near the bottom of said frame to said frame, hook means pivoted to said arm means near the top of the same engageable with the other side of the tire casing, and expandable means supported by, and directly connecting said frame and arm means and suspended therebetween to pivot said arm means to spread a tire casing engaged by said hooks.

4. In a tire spreader, a supporting frame, hook means pivoted to one end of said frame engageable with one side of a tire casing, arm means pivoted at one end to the other end of said frame, hook means on the other end of said arm means engageable with the other side of a tire casing, and means for pivoting said arm means to spread a tire casing engaged by said hooks, said pivoting means comprising a cylinder containing a piston and piston rod, and means pivotally connecting said cylinder, piston, and rod to said frame and to said arm means, said cylinder, piston, and rod extending between said frame and arm means.

5. In a tire spreader, a frame including a pair of spaced parallel rods, rotatable sleeves on said rods longitudinally slidable with respect to said frame upon which a tire may rest, hook means pivotally secured near one end of said rods to said frame engageable with one side of said tire, means on said frame swingable away from said hook means, hook means pivotally secured near the other ends of said rods to said swingable means engageable with the other side of a tire, and means engaging said swingable means for swinging the same away from said first named hook means spreading said hook means apart to spread the tire supported upon said sleeves.

6. In a tire spreader, a frame including a pair of spaced parallel substantially horizontal rods, rotatably and longitudinally slidable sleeves on said rods, hook means pivoted to said frame adjacent each end of said rods each engageable with one side of a tire casing, and means moving said hook means away from one another to spread and to slide longitudinally of said rods a tire casing supported on said sleeves.

7. In a tire spreader, an upright frame, relatively pivotal members on said frame pivoted near the bottom thereof, hook ends on the upper ends of said members engageable with opposite sides of a tire casing, and means for relatively pivoting said members comprising a cylinder pivoted to one of said relatively pivotal members, a piston in said cylinder, and a piston rod on said piston pivotally secured to the other of said relatively pivotal members.

8. In a tire spreader, a frame, end post means thereon at one end thereof, end post means pivoted to said frame at the other end thereof, means pivoting said pivoted end post means away from said first named end post means, hooks on said end post means engageable with opposite sides of a tire casing, spaced parallel rods extending between said first end post means and said pivoted end posts, said rods secured in fixed relation to one of said end post means, and longitudinally slidable sleeves on said rods upon which a tire casing may rest while being spread by said hooks.

9. In a tire spreader, a frame, two pairs of relatively pivotal end posts on said frame swingable apart, end members telescopically secured to the upper ends of said end posts, said end members connected by a cross member to operate in unison therewith, hook means pivotally secured to said end members engageable with opposite sides of a tire casing, and means for pivoting said pairs of end posts apart to spread a tire.

10. In a tire spreader, a frame, hollow end posts on one end of said frame rigidly connected thereto, a pair of hollow end posts pivotally secured to the other end of said frame near the bottom thereof, end members telescopically engaging the upper ends of all said hollow end posts, said end members connected by a cross member to operate in unison therewith, hook means on said end members engageable with opposite sides of a tire casing, and means pivoting said pivotally secured end posts away from said rigidly connected end posts to spread a tire.

11. In a tire spreader, a frame for supporting a tire while it is spread, and a lift for said spreader, said lift comprising a sleeve pivoted to said frame, a casing supporting plate on said sleeve, a handle rod, said handle rod extending through said sleeve, said handle rod adapted to contact the floor at various distances from said frame, and said handle rod adapted to fit into one of the tubular front legs of said frame to hold said lift in a vertical position to said frame when not in use.

CHARLES E. BRANICK.